(12) United States Patent  
Rooney et al.

(10) Patent No.: US 7,921,462 B2  
(45) Date of Patent: Apr. 5, 2011

(54) IDENTIFYING A DISTRIBUTED DENIAL OF SERVICE (DDOS) ATTACK WITHIN A NETWORK AND DEFENDING AGAINST SUCH AN ATTACK

(75) Inventors: John G. Rooney, Zurich (CH); Christopher J. Giblin, Zurich (CH); Marcel Waldvogel, Stein am Rhein (CH); Paul T. Hurley, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/126,976

(22) Filed: May 26, 2008

(65) Prior Publication Data

US 2008/0271146 A1 Oct. 30, 2008

(51) Int. Cl.  
*G06F 11/00* (2006.01)  
*G06F 12/14* (2006.01)  
*G06F 12/16* (2006.01)  
*G08B 23/00* (2006.01)

(52) U.S. Cl. ............... 726/23; 713/151; 713/153  
(58) Field of Classification Search ............... 726/23, 726/22; 713/151, 153  
See application file for complete search history.

(56) References Cited

U.S. PATENT DOCUMENTS

| | | | |
|---|---|---|---|
| 6,347,090 B1 * | 2/2002 | Ooms et al. | 370/428 |
| 6,738,361 B1 * | 5/2004 | Immonen et al. | 370/328 |
| 6,898,641 B1 * | 5/2005 | Kobayashi | 709/238 |
| 7,443,822 B2 * | 10/2008 | Lindskog et al. | 370/338 |
| 7,453,851 B2 * | 11/2008 | Westphal et al. | 370/331 |
| 7,613,179 B2 * | 11/2009 | Soukup | 370/389 |
| 2001/0021189 A1 * | 9/2001 | Shiota | 370/389 |
| 2003/0110288 A1 * | 6/2003 | Ramanujan et al. | 709/238 |
| 2004/0008689 A1 * | 1/2004 | Westphal et al. | 370/395.21 |
| 2004/0250114 A1 * | 12/2004 | Parekh et al. | 713/201 |
| 2005/0013253 A1 * | 1/2005 | Lindskog et al. | 370/238 |
| 2005/0111447 A1 * | 5/2005 | Soukup | 370/389 |

* cited by examiner

*Primary Examiner* — David Garcia Cervetti  
(74) *Attorney, Agent, or Firm* — Michael J. Buchenhorner; Vazken Alexanian

(57) ABSTRACT

The invention provides methods, apparatus and systems for detecting distributed denial of service (DDoS) attacks within the Internet by sampling packets at a point or points in Internet backbone connections to determine a packet metric parameter. The packet metric parameter which might comprise the volume of packets received is analyzed over selected time intervals with respect to specified geographical locations in which the hosts transmitting the packets are located. The expected behavior can be employed to identify traffic distortions revealing a DDoS attack. In a complementary aspect, the invention provides a method of authenticating packets at routers in order to elevate the QoS of authenticated packets. This method can be used to block or filter packets and can be used in conjunction with the DDoS attack detection system to defend against DDoS attacks within the Internet in a distributed manner.

21 Claims, 8 Drawing Sheets

IDENTIFYING A DISTRIBUTED DENIAL OF SERVICE (DDOS) ATTACK WITHIN A NETWORK AND DEFENDING AGAINST SUCH AN ATTACK

FIELD OF THE INVENTION

The present invention is directed to identifying a distributed denial of service (DDoS) attack within a packet data network and defending against such an attack. More particularly, the present invention concerns identifying a DDoS attack against a target (victim) device, system and/or network connected to the Internet and to a method of mitigating the effects of such an attack on the target.

BACKGROUND TO THE INVENTION

A denial of service (DoS) attack is an explicit attempt by an attacker or attackers to prevent or impair the legitimate use of a host computer, a router, a server, a network or the like. Whilst such attacks can be launched from within a target network itself, the overwhelming majority of such attacks are launched from external systems and networks connected to the target via the Internet. Internet connected devices, systems and networks are today facing a rapidly expanding and real threat from DoS attacks. Such attacks not only damage the intended target but threaten the stability of the Internet itself. The motive for most DoS attacks still appears to be driven by a desire to "show-off", express anger or seek revenge by computer hackers, for example, but evidence exists that DoS attacks are increasingly being used by cyber-criminals to blackmail enterprises drawing most of their revenues from on-line (Internet based) activities and the fear is that terrorists will use DoS attack as a means of disrupting good governance by governmental organisations.

The ease with which DoS attacks can be launched from within the Internet is a direct consequence of the features that have made the Internet so successful. The Internet was designed with functionality, not security, in mind. It follows an end-to-end paradigm whereby communicating end hosts deploy complex functionalities to achieve desired service guarantees, while the intermediate networks (the Internet) connecting said end hosts provide a bare minimum, best efforts service. As such, the Internet is managed in a distributed manner so no common policy can be enforced among its users. This design freedom, which affords easy user participation in the Internet, provides opportunities for abuse such as DoS attacks.

DoS attackers take advantage of the fact that the Internet is comprised of limited resources. The interconnected Autonomous Systems (ASes) comprising the core of the Internet and the networks, systems and devices connected thereto are composed of limited bandwidth, processing power and storage capacities that are all common targets for DoS attacks designed to consume enough of a target's available resources to cause some level of service disruption. Also, security in the Internet is highly interdependent. As such, DoS attacks are commonly launched from systems that are subverted through security related compromises. Intrusion defence systems not only help to protect the Internet resources they specifically support but also help to prevent the use of such resources to attack other Internet connected systems and networks. Consequently, no matter how well guarded an Internet resource is, its security is also dependent on the state of security in the rest of the Internet. Other factors that contribute to the ease with which DoS attacks can be initiated within the Internet are the fact that most of the intelligence needed for service guarantees between end hosts is located with the end hosts rather than within the Internet and that the Internet employs high bandwidth pathways between the intermediate networks that can carry large volumes of messages to a target.

Early DoS attack technology involved simple tools that generated and sent packets from a single source to a single destination. Often these attacks were manually configured which limited their frequency and effectiveness and which could be readily defended against by source address packet filtering, for example. In recent years, however, tool kits have evolved for automatically executing multiple source attacks against one or more targets, so called distributed DoS (DDoS) attacks. These tool kits are readily available for downloading from hacker websites and are so simple to use that even unsophisticated Internet users can set up DDoS attacks.

Multiple source attacks on a single target are presently the most common form of DDoS attacks launched against Internet connected devices, systems and networks. Such attacks take advantage of the huge resource asymmetry between the Internet and the target in that a sufficient number of compromised hosts are amassed to send useless packets toward the target at generally the same time. The magnitude of the combined traffic is often sufficient to cause the target system or network to crash and/or flood its Internet connection thereby effectively removing the target from the Internet for at least the duration of the attack. These types of attack are commonly referred to as packet flooding DDoS attacks.

Whereas with single source DoS attacks it was possible to trace the source of the attack where the packets contained the actual source address and to employ packet filtering, for example, to discard packets being received from that source, DDoS attacks are more malicious in that the number of subverted hosts sending useless packets towards the target may number in the tens of thousands and even hundreds of thousands and in that address spoofing masking the identities of the subverted hosts is also often employed. Even if the sources of the useless packets can be identified, this may not assist the target in defending itself since the received packets may be from legitimate sources prompted to send packets towards the target as occurs in so called reflector or indirect DDoS attacks. Blocking packets from these sources will also block packets from legitimate users.

A successful DDoS is easily detected at the target since it sees all the attack packets which are causing it to become saturated and fail. Although detection of a DDoS attack allows the target to implement defences such as packet filtering, whilst it still has some available packet processing resources not overwhelmed by the attack, the detection of the attack does not necessarily result in the effective filtering of the attack packets to maintain some level of service at the target. Due to the distributed nature of the attack, packet filtering at or near the target normally drops normal (legitimate) packets as well as attack packets since the packet filterers are unable to distinguish between them leading to at least an impairment of service at the target. Consequently, detection of a DDoS at the target is not generally effective since it is invariably too late for the target to mount an effective defence.

The paradox facing a target network is that the ability to detect a DDoS attack is greater the closer the means of detection is located to the target network whereas the effectiveness of filtering packets to discard attack packets declines as attack packets are dropped closer to the target network, i.e. it is considerably more effective to filter attack packets close to the attack sources since such filtering is less likely to cause the dropping of legitimate packets destined for the target.

Frequently, a target network's Internet Service Provider (ISP) network will drop all packets destined for the target network once a DDoS attack is detected thereby effectively suspending service at the target network and, in any event, negating the target network's efforts to defend itself against the DDoS attack.

One solution to the problem of detecting a DDoS attack before the aggregated effect of the attack packets overwhelms the target is to deploy a system in the Internet away from the target. Such a system uses information about the expected behaviour of network traffic at some selected point in the Internet to determine when an attack is occurring. Systems of this sort are currently available and are generally referred to as "Internet Firewalls". All such systems monitor the packets crossing a point or points in the Internet, analyse some aspect of the aggregated packet stream behaviour and try to determine whether it is significantly deviating from normal behaviour as a method of detecting a DDoS attack. The key problem is trying to characterise what constitutes normal behaviour. Absolute measures such as the expected number of packets going to a given destination address or the ratio of User Datagram Protocol (UDP) to Transmission Control Protocol (TCP) packets are of limited value as traffic patterns can rapidly change for legitimate reasons such as a new web site becoming popular or a new application being deployed. Other techniques such as recording the ratio of TCP SYN to ACK messages can identify some DoS attacks but attackers have shown an impressive ability to quickly by-pass detection tools using such distinct parameters.

Irrespective of where and how a DDoS attack is detected, currently proposed methodologies for defending against such an attack, aside from simply discarding all packets (both legitimate and attack) destined for the target, includes at least the target and/or its ISP performing ingress packet filtering. This involves the ISP verifying that the source address of a packet is appropriate for that incoming target system link. However, this requires the ISP to upgrade its equipment which it has little incentive to do since the ISP is rarely overwhelmed itself by a DDoS attack on one of its clients (subscribers). It therefore follows that this is a responsibility that ISPs are reluctant to commit to.

Another approach to defending against a DDoS attack includes augmenting the routing information of packets to allow even remote ISPs to identify the possible links that a packet with a particular source address might have come from. However, this again requires the ISPs to upgrade their equipment for little apparent benefit, particularly those ISPs that have no remunerative relationship with the target.

Using existing fields in the Internet Protocol (IP) header outside of their intended use to include pieces of information that allow, given enough packets, the receiver to reconstruct the paths the packets have taken is an approach that can allow the receiver to filter out attack packets. However, this approach can still be abused by an attacker to convey large amounts of false information to the target (receiver) so is of limited effectiveness.

Tailgating a small subset of the existing packets with a specific control packet that indicates the source of the packets by say indicating one router that the packets have passed through also assists the receiver in filtering out attack packets. However, this approach does not address the problem of identifying the legitimate routers and creates additional traffic which is only of advantage during a DDoS attack but is disadvantageous at other times from a network capacity viewpoint.

The problem therefore remains how to identify a DDoS attack and how to block or reduce its effect when it occurs.

Existing approaches to detecting DDoS attacks at some selected point (or points) in the Internet are based on parameters that are highly variable with time and which are apt to evolve as the technology of the Internet advances leading to obsolescence. What is required therefore is an approach based on parameters that are both invariant of changes in technology and are general enough to have a good probability of detecting many DDoS attacks.

Despite the moves to place DDoS attack detection systems into the Internet, most DDoS detection and defence systems are located at the edge of the Internet operated by the end hosts (receivers, possible targets) who wish to protect their networks, systems and devices from such attacks. The defence systems mainly rely on packet filtering to defend an attack which, given the nature of flooding packet attacks, must have high processing capacity if the filtering system is not itself going to become overwhelmed. At present, there is little by way of incentive for competing ISPs to upgrade their networks to defend against DDoS attacks although this may change as legislative pressures are brought to bear around the world. There is therefore a need to provide a method of enabling receivers to more intelligently filter received packets and to create an incentive for other connected systems and networks of the Internet to assist this process.

SUMMARY OF THE INVENTION

Therefore, the present invention provides methods, apparatus and systems of detecting DDoS attacks at suitable points within the Internet which mitigates and/or obviates disadvantages associated with known detection systems, particularly Intrusion Detection Systems including Internet Firewalls as presently available. The present invention also provides novel means for implementing such a method. The present invention also provides method of more intelligently filtering received packets at a target network or the like which mitigates and/or obviates disadvantages associated with existing DDoS defence systems and to providing a means for implementing the method.

According to a first aspect of the invention, there is provided a method of detecting a distributed denial of service (DDoS) attack in the Internet, characterized in that the system comprises the steps of: sampling packets at a point in the Internet during a number of time intervals of a first predetermined time period to obtain data pertaining to the source addresses of the packets and their associated time intervals; analysing said data to obtain for each time interval at least one parameter relating to a packet metric for packets received at said point from respective specified geographical regions; and for a time interval of a next predetermined time period, comparing a packet metric parameter for packets received in that time interval from a specified geographical region with a threshold derived from the at least one packet metric parameter obtained for the corresponding time interval of the first predetermined time period, the result of said comparison being used to determine the existence of a DDoS attack.

According to a second aspect of the invention, there is provided a system for detecting a distributed denial of service (DDoS) attack in the Internet.

According to a third aspect of the invention, there is provided an analyzer for detecting a distributed denial of service (DDoS) attack in the Internet.

According to a fourth aspect of the invention, there is provided a computer comprising a memory storing program code executable by a processor for implementing the method in accordance with the first aspect of the invention.

According to a fifth aspect of the invention, there is provided a computer readable medium containing computer code executable by a processor for implementing the method in accordance with the first aspect of the invention.

According to a sixth aspect of the invention, there is provided a method of authenticating a packet at a router in a connection between a sending host and a receiving host.

According to a seventh aspect of the invention, there is provided a router for authenticating a packet received at the router in a connection between a sending host and a receiving host.

According to an eighth aspect of the invention, there is provided a computer comprising a memory storing program code executable by a processing unit for implementing the method in accordance with the sixth aspect of the invention.

According to a ninth aspect of the invention, there is provided a computer readable medium containing computer code executable by a processing unit for implementing the method in accordance with the sixth aspect of the invention.

Other features of the invention will be apparent from the appended claims.

BRIEF DESCRIPTION OF THE DRAWINGS

Embodiments of the invention are described below in more detail, by way of example, with reference to the accompanying drawings, in which.

DESCRIPTION OF THE INVENTION

Figure 1:
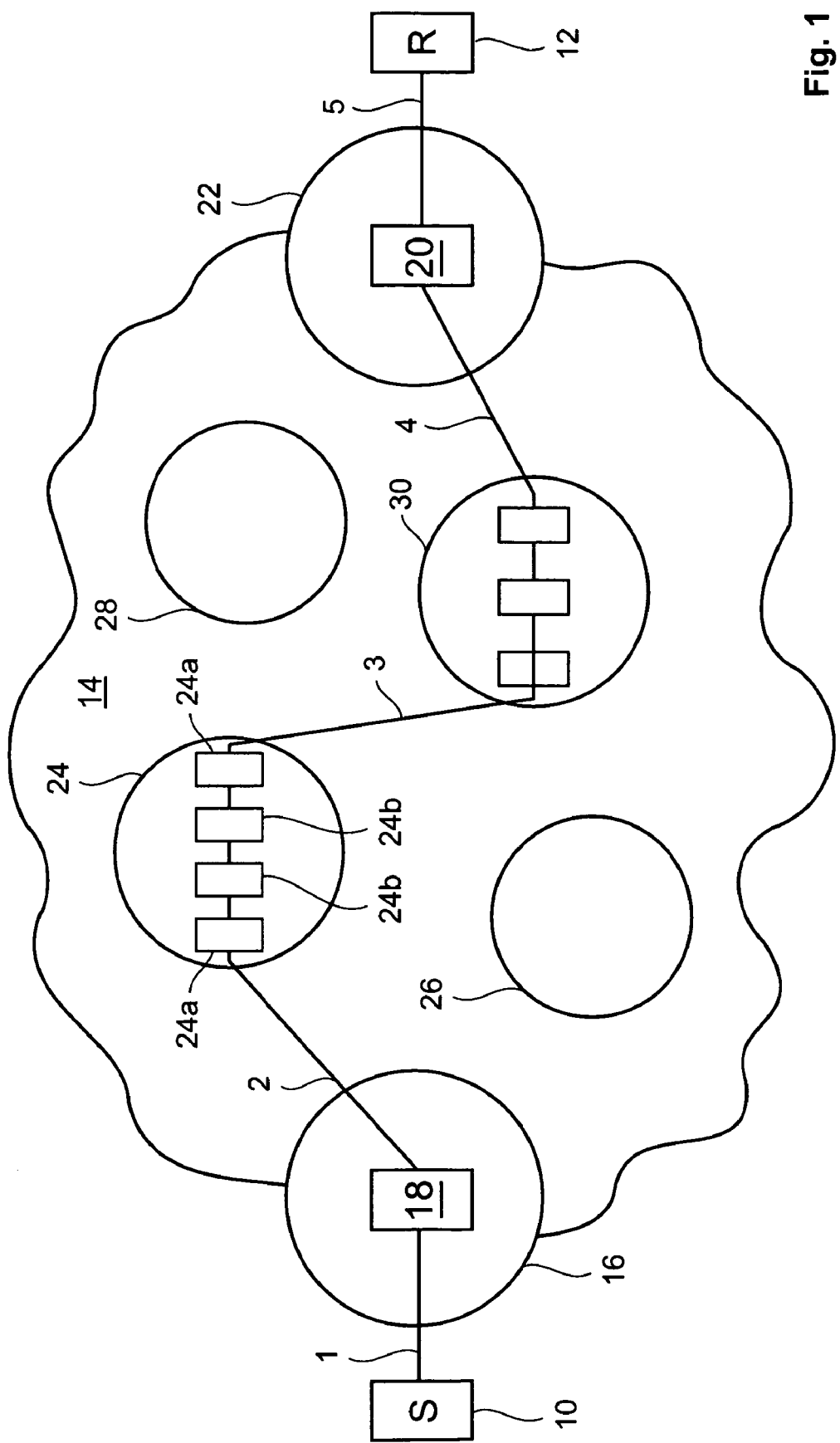
FIG. 1 is a schematic illustration of an end to end packet switched connection across the Internet.

The present invention provides methods, apparatus and systems of detecting DDoS attacks at suitable points within the Internet which mitigates and/or obviates disadvantages associated with known detection systems, particularly Intrusion Detection Systems including Internet Firewalls as presently available. The present invention also provides novel means for implementing such a method. The present invention also provides method of more intelligently filtering received packets at a target network or the like which mitigates and/or obviates disadvantages associated with existing DDoS defence systems and to providing a means for implementing the method.

In another example embodiment, the invention provides a method of detecting a distributed denial of service (DDoS) attack in the Internet. The method comprises the steps of: sampling packets at a point in the Internet during a number of time intervals of a first predetermined time period to obtain data pertaining to the source addresses of the packets and their associated time intervals; analysing said data to obtain for each time interval at least one parameter relating to a packet metric for packets received at said point from respective specified geographical regions; and for a time interval of a next predetermined time period, comparing a packet metric parameter for packets received in that time interval from a specified geographical region with a threshold derived from the at least one packet metric parameter obtained for the corresponding time interval of the first predetermined time period, the result of said comparison being used to determine the existence of a DDoS attack.

In another example embodiment, the invention provides a system for detecting a distributed denial of service (DDoS) attack in the Internet, characterized in that the system comprises: a packet sampler for sampling packets at a point in the Internet during a number of time intervals of a first predetermined time period to obtain data pertaining to the source addresses of the packets and their associated time intervals; an analyzer for analysing said data to obtain for each time interval at least one parameter relating to a packet metric for packets received at said point from respective specified geographical regions; and for comparing a packet metric parameter for packets received from a specified geographical region during a time interval of a next predetermined time period with a threshold derived from the at least one packet metric parameter obtained for the corresponding time interval of the first predetermined time period, the result of said comparison being used to determine the existence of a DDoS attack.

In another example embodiment, the invention provides an analyzer for detecting a distributed denial of service (DDoS) attack in the Internet, characterized in that it comprises: a processing unit arranged to retrieve data from a data storage facility, said data pertaining to the source address of each of a plurality of sampled packets received at a point in the Internet and a time interval for each packet during which it was sampled, said time intervals comprising a predetermined time period; the processing unit being arranged to execute software code comprising an analyzer program to obtain for each time interval at least one parameter relating to a packet metric for packets received at said point from respective specified geographical regions; and for comparing a packet metric parameter for packets received from a specified geographical region during a time interval of a next predetermined time period with a threshold derived from the at least one packet metric parameter obtained for the corresponding time interval of the (first) predetermined time period, the result of said comparison being used to determine the existence of a DDoS attack.

In another example embodiment, the invention provides a computer comprising a memory storing program code executable by a processor for implementing the method in accordance with the first aspect of the invention.

In another example embodiment, the invention provides a computer readable medium containing computer code executable by a processor for implementing the method in accordance with the first aspect of the invention.

In another example embodiment, the invention provides a method of authenticating a packet at a router in a connection between a sending host and a receiving host, characterized in that it comprises the steps of: reading a value of a token from a token data set inserted in a header of said packet by the sending host, said token data set being obtained from a number of routers comprising the connection on initiation of the connection; verifying said read token at the router; and, where the result of the verification step is true, providing said packet with an elevated quality of service (QoS).

In another example embodiment, the invention provides a router for authenticating a packet received at the router in a connection between a sending host and a receiving host, characterized in that it comprises: a processing unit arranged to: read a value of a token from a token data set inserted in a header of said packet by the sending host, said token data set being obtained from the router and a number of other routers comprising the connection on initiation of the connection; to verify said read token at the router; and, where the result of the verification step is true, to provide said packet with an elevated quality of service (QoS).

In another example embodiment, the invention provides a computer comprising a memory storing program code executable by a processing unit for implementing the method in accordance with the sixth aspect of the invention.

In another example embodiment, the invention provides a computer readable medium containing computer code executable by a processing unit for implementing the method in accordance with the sixth aspect of the invention.

The Internet is a global network of networks which interlinks many diverse layer-2 networks through a simple common layer-3 protocol called the Internet Protocol (IP). The Transport Control Protocol (TCP) is the protocol underlying the software systems employed in the Internet to ensure that the constituent packets of a transmission of information is received in uncorrupted form and reassembled in the correct sequence whereas IP is the protocol underlying the software systems that permit said packets of information to get from one IP address to another. Each computing device on the Internet is assigned a unique 32 bit IP address typically written as four numbers separated by periods, e.g. 193.32.2.36. Depending on the nature of the connection between the computing device and its Internet Service Provider (ISP), the IP address assigned to the device may be permanent or temporary, but in either case it is unique. The Internet Assigned Numbers Authority (IANA) is the global body responsible for issuing IP addresses. The Internet is therefore a TCP/IP based packet data network and, as such, it comprises a packet switched network rather than a circuit switched network in contrast with conventional telephony networks such as a public switched telephone system (PSTN), for example.

Referring to the drawings, FIG. 1 is a schematic illustration of an end to end packet switched connection comprising links 1, 2, 3, 4 & 5 between a sending (source) end host (S) 10 and a receiving (destination) end host (R) 12 across the Internet (represented as a cloud formation) 14. The sending host 10 and/or receiving host 12 may comprise a stand-alone device such as a personal computer (PC) or such a device within a system and/or network connected to the Internet 14. Alternatively, the sending host 10 and/or receiving host 12 may comprise a web server or a router of an enterprise network, for example, or any other IP enabled device having an IP address and being capable of transmitting and receiving IP packets.

The sending host 10 is connected to the Internet 14 by an Internet Service Provider (ISP) 16 which includes an Internet edge gateway router 18 for transmitting IP packets from and receiving IP packets addressed to said source host 10. The link 1 between the source host 10 and the ISP 16 may comprise any suitable link known to a skilled artisan including, for example, a modem to modem link through a PSTN, an Ethernet Local Area Network (LAN) connection, etc. The source host 10 and/or receiving host 12 may comprise an Internet connected network and, in effect, be its own ISP as is common with large enterprise, academic institution and governmental organisation networks connected to the Internet. The receiving host 12 is connected to an Internet edge gateway router 20 of an ISP 22 via the link 5.

The Internet 14 comprises a network of networks such as ISPs 16, 24 and other intermediate networks 24, 26, 28, 30. The end to end packet switched connection 1-5 is formed through some of these networks for the transmission of IP packets from the source host 10 to the receiving host 12. Similarly, a packet switched connection (not shown) may be formed between the receiving host 12 and the source host 10 for the transmission of IP packets in a reverse direction but this "reverse" connection need not follow the same path as the "forward" connection 1-5. The intermediate networks 24, 26, 28, 30 may themselves comprise ISPs and/or Network Service Providers (NSPs).

Figure 2:
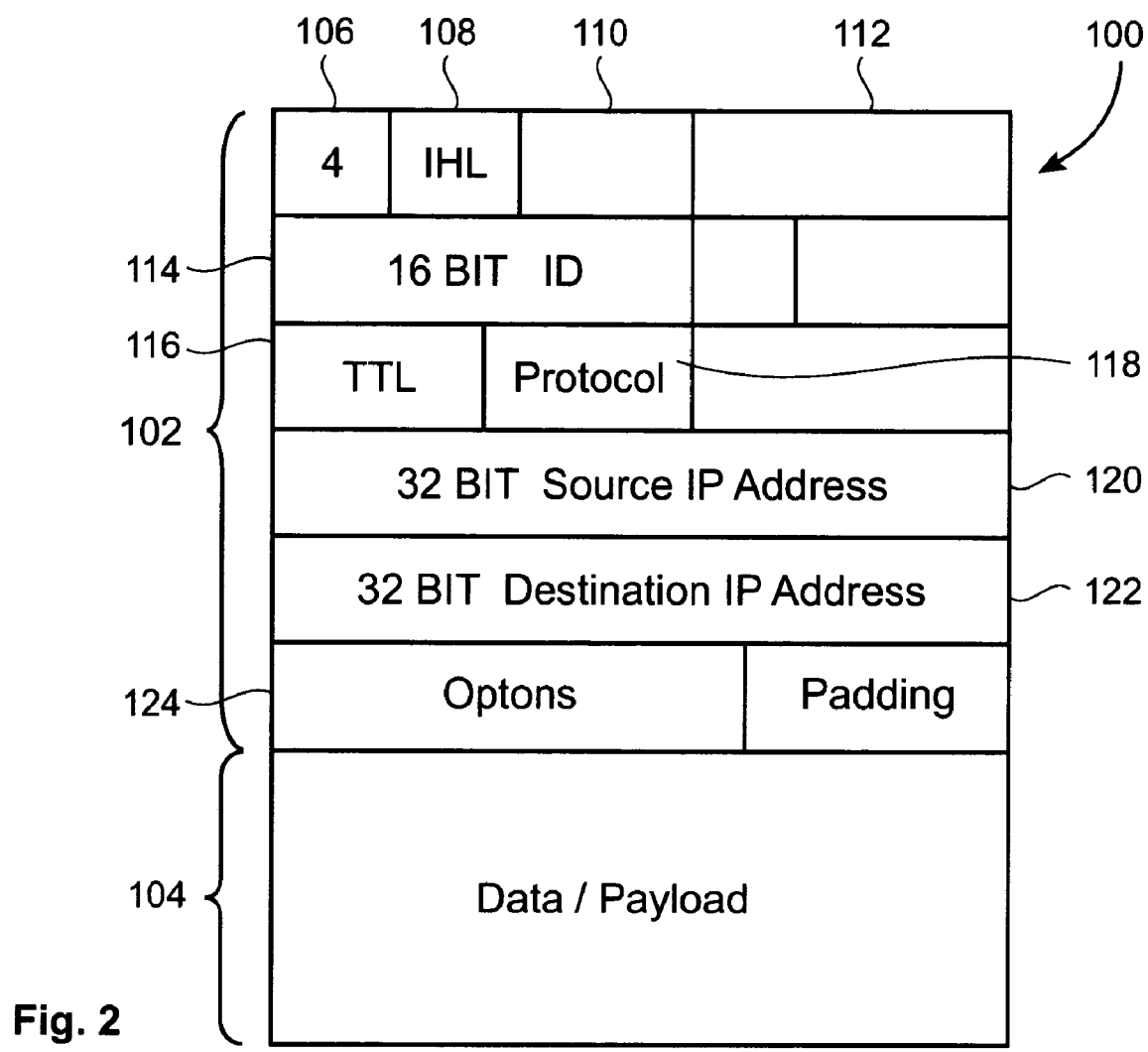
FIG. 2 is a schematic diagram of the structure of an IPv4 datagram.

As illustrated in FIG. 2, an IPv4 datagram (packet) 100 has a header portion 102 and a payload (data to be sent to the receiving node) portion 104 (not represented to scale). The header portion 102 comprises various fields including:

1. A version field 106 which is normally set to "4" identifying the currently most widely utilised version of IP (IPv4) that is employed in the Internet.
2. An IP header length (IHL) field 108 which identifies the number of 32 bit words forming the header portion 102. This is usually five.
3. A differentiated services field 110 containing a code point (DSCP) which is usually set to "0" but which may indicate a particular quality of service (QoS) needed from the network.
4. A size of datagram field 112 showing the combined size in bytes of the IP header portion 102 and payload portion 104 of the IP packet 100.
5. An identification field 114 comprising a 16 bit number which together with a source address uniquely identifies the packet. This field is employed at a receiver during reassembly of fragmented packets.
6. A time to live (TTL) field 116 comprising a number of hops/links a packet may be routed over. This field is decremented by the routers a packet encounters as a means of preventing accidental routing loops. When the value in this field is decremented to zero the packet is discarded.
7. A protocol field 118 or service access point (SAP) indicating the type of transport packet being carried. Common values for this field are 1=ICMP; 2=IGMP; 6=TCP; and 7=UDP. ICMP is the Internet Control Message Protocol which is used for out-of-band messages related to network operation or non-operation. IGMP is the Internet Group Message Protocol which sets the standards for multi-cast messaging over the Internet.
8. A source address field 120 containing the 32 bit period spaced numerical IP address of the sender of the packet.
9. A destination address field 122 containing the 32 bit period spaced numerical IP address of the final destination of the packet.

10. An options field 124 which is not normally used except when the IHL is greater than five 32 bit words, although a "Record Route" option may be set to trace the route an IP datagram takes. This option obtains the IP addresses of routers through which the datagram flows.

It will be appreciated that the above list of fields is not exhaustive of the fields found in an IPv4 header portion 102 which includes such fields (not illustrated in FIG. 2) as a fragmentation flag field and a fragmentation offset field relating to when routers can fragment an IP packet.

Referring again to FIG. 1, an IP packet being sent from the source host 10 to the receiving host 12 is forwarded on a hop by hop basis. In the case where the sending host 10 is an IP enabled device having a unique IP address, said host 10 will transmit the packet over link 1 to gateway router 18 of its ISP 16 having inserted in the header portion 102 of the packet its own IP address as the source address and the IP address of the intended destination which, in this example, comprises the receiving host 12. On receiving the packet, the gateway router 18 examines the IP destination address and checks its routing table which consists of destination address/next hop pairs. If the destination IP address is found in the gateway router's routing table then the packet is forwarded on the associated next hop (link 2) to the next router in the path towards the receiving host 12. If the destination IP address is not found in the gateway router's routing table then it sends the packet on a default route up a hierarchy of the intermediate networks 26, 28, 30, 32 to a router which will hopefully know where to forward the packet to. This process is repeated at each router receiving the packet until it reaches (through links 3, 4 & 5) its intended destination or the TTL value in the IP header of the packet decrements to zero.

Each intermediate network 26, 28, 30, 32 comprises a network of routers in the form of an autonomous system (AS). An AS is defined in the Internet Engineering Task Force (IETF) Request for Comments (RFC) Number 1930 of March 1996 as a set of routers under a single technical administration, using an interior gateway protocol (IGP) and common metrics to route packets within the AS and an exterior gateway protocol (EGP) to route packets to other ASes. Whilst in practice many ASes use several IGPs and sets of metrics within the AS, the administration of an AS should appear to other ASes as having a single coherent interior routing plan and presents a consistent picture of what networks are reachable through it. In FIG. 1, intermediate network 24 can be seen as comprising an AS having a number of external gateway routers 24a and a number in interior gateway routers 24b. The ISPs 16, 22 may also comprise ASes.

Figure 3:
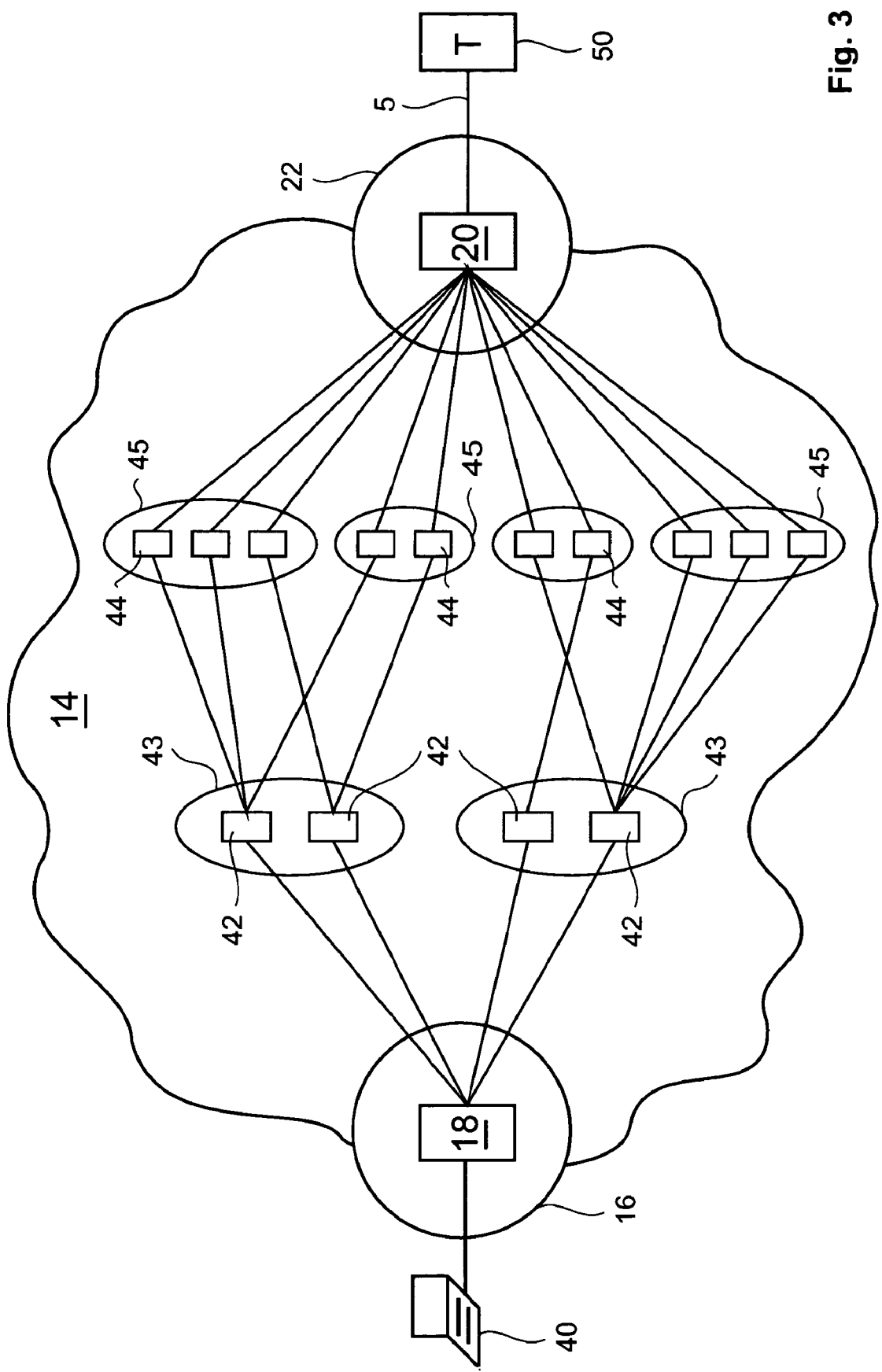
FIG. 3 is a schematic illustration of a DDoS attack network of the direct type.

Referring now to FIG. 3, illustrated schematically is a distributed denial of service (DDoS) attack network of the direct type orchestrated by an attacker 40 against a target machine (T) 50 over the Internet 14. The attacker 40 which may comprise a simple stand-alone PC sets up a DDoS attack network comprising a number of handler or master devices 42 and a larger number of agent devices (often referred to as zombies or daemons) 44. The handler devices 42 are compromised computers used by the attacker 40 to scan for other vulnerable hosts (agents) and to install programs such as Trinoo, Tribe Flood Network 3000 and Stracheldracht. Computer viruses and worms are often used to install such backdoors and/or control programs.

Once an attack network is ready, the attacker identifies a target machine 50 and launches an attack command with the target's IP address, attack duration, attack methods and other instructions to the handler devices 42. Each handler device 42 passes the instructions to its agent devices 44. Communication between the attacker 40, handler devices 42 and agent devices 44 is typically via a channel such as an Internet Relay Channel (IRC) that makes it difficult or impossible for the owners of the handlers 42 and agents 44 to identify the origin of the commands received from the attacker 40.

The type of packet streams that are commonly used in DDoS attacks includes a stream of TCP packets with various flags set addressed to the target 50, ICMP echo request/reply (ping) packets, and UDP packets. In the TCP case, SYN flooding is the most well-known attack. The attacker 40 often hides the identities of the agent devices 44 through spoofing of the source address fields in the packets so that the agent devices 44 can be re-used in future attacks on the same or a different target. Whilst the handler devices 42 on the one hand and the agent devices 44 on the other are shown as being located within respectively aligned network clouds 43, 45, it will be understood that this is merely for ease of illustration and that both handlers 42 and agents 44 comprise compromised computers connected to the Internet 14. These computers can be located anywhere within (connected to) the Internet and may be located within different networks or even comprise stand-alone machines. Typically, owners of home PCs are not security conscious and consequently are ignorant of the possibility that their PCs can be easily compromised as part of a DDoS attack network.

When the attack is launched, the target 50 is faced with a huge volume of useless packets that flood its Internet connection 5 and overwhelm its processing capacity.

Figure 4:
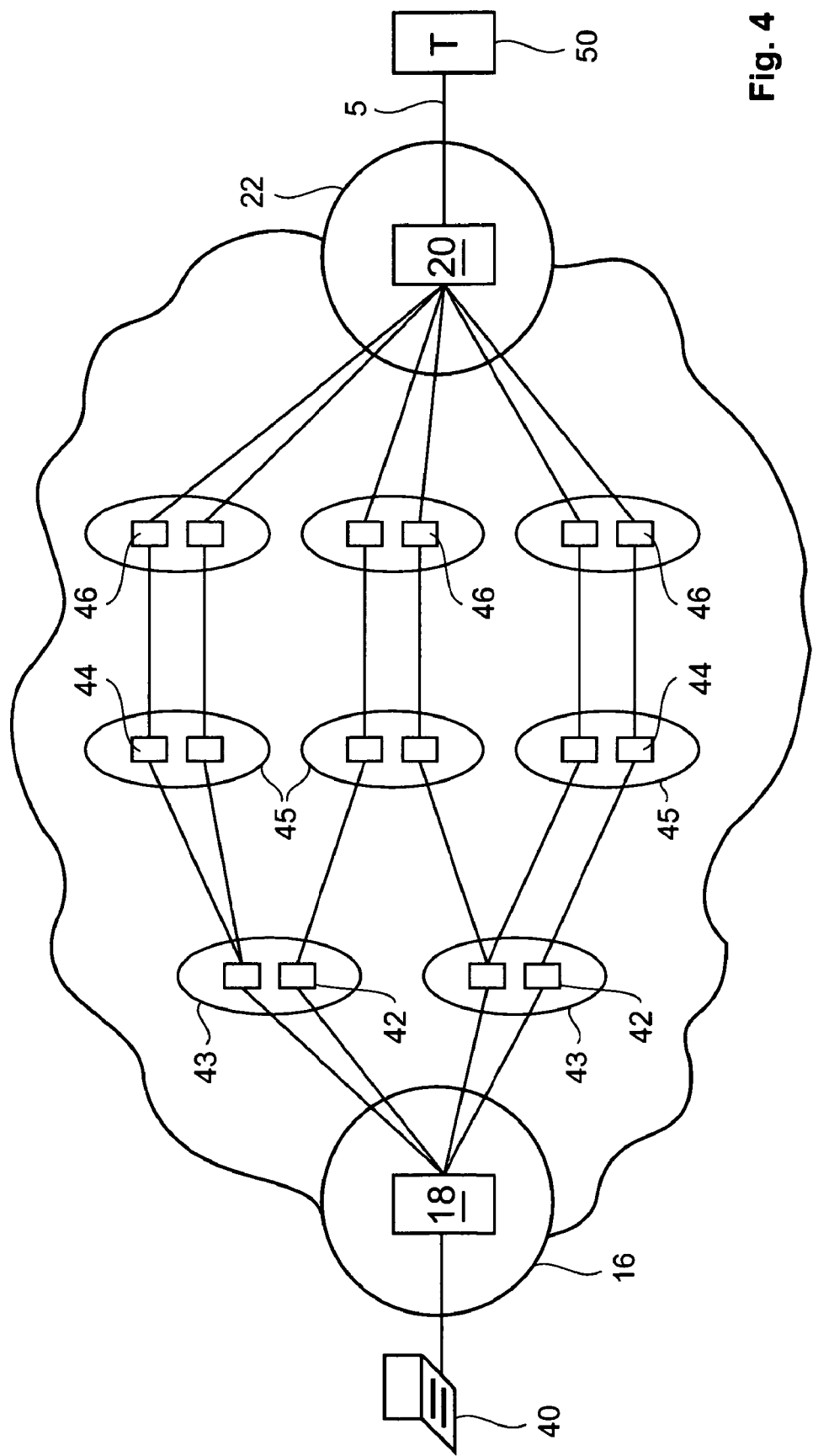
FIG. 4 is a schematic illustration of a DDoS attack network of the indirect or reflector type.

In an indirect or reflector attack as illustrated in FIG. 4, a number of intermediary nodes 46 such as routers and/or servers are innocently used as attack launchers. An attacker 40 establishes an attack network as before but causes the agent devices 44 to send request packets to the intermediary nodes 46 that require responses with the request packets' inscribed source addresses set to the IP address of the target machine 50. Without knowing that the request packets are source address spoofed to the target's address, the intermediary nodes 46 flood the target machine 50 with response packets according to the type of request packets. The TCP and UDP can be exploited to launch an indirect attack. Whilst the intermediary nodes 46 are shown in FIG. 4 in a one-to-one relationship with the agent devices 44, it will be understood that this is merely for ease of illustration.

As hereinbefore discussed, detection of a DDoS attack is most effective close to the target network, system or device but that detection at this point in the Internet commonly results in the target becoming overwhelmed before it can mount an effective defence. In accordance with its first main aspect, the present invention provides a DDoS detection system that is located within the Internet so as to detect DDoS attacks before the aggregated effect of the attack can overwhelm its target and such that it can share DDoS attack detection information with similar other detection systems.

Figure 5:
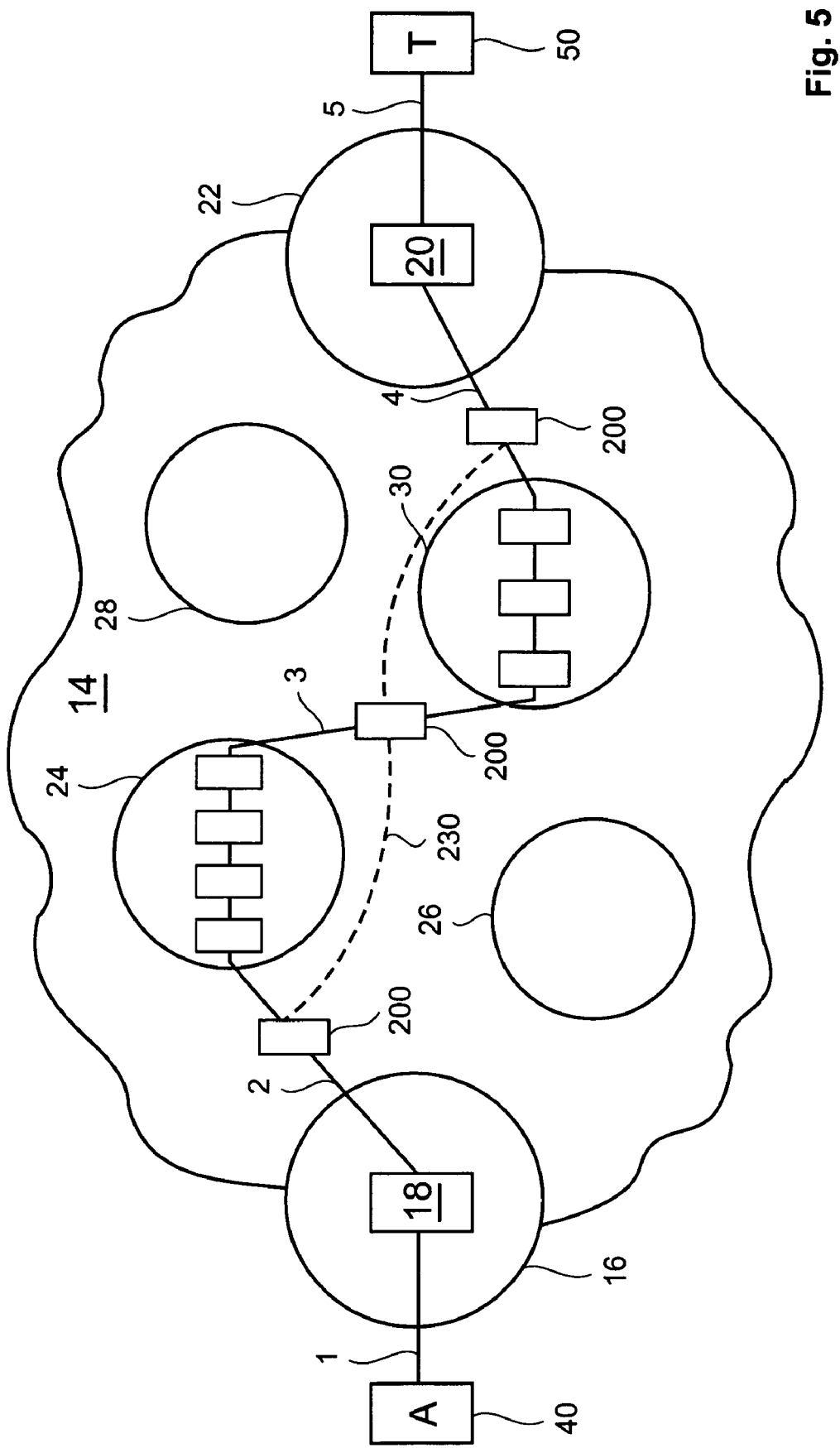
FIG. 5 is a schematic illustration of the Internet incorporating DDoS detection systems in accordance with a first main aspect of the invention.

Referring to FIG. 5, in its first main aspect, the invention comprises a DDos attack detection system 200. The attack detection system 200 is located at a point in the Internet 14 where it can sample packets being transmitted over a link between two networks such as an ISP 16, 22 and an NSP 24, 30 or between two ASes such as NSPs 24 and 30, for example. The detection system 200 may be physically located with a router/gateway at an edge of any such ISP, NSP and AS network, being the router/gateway that interfaces the periphery of the network.

Figure 6:
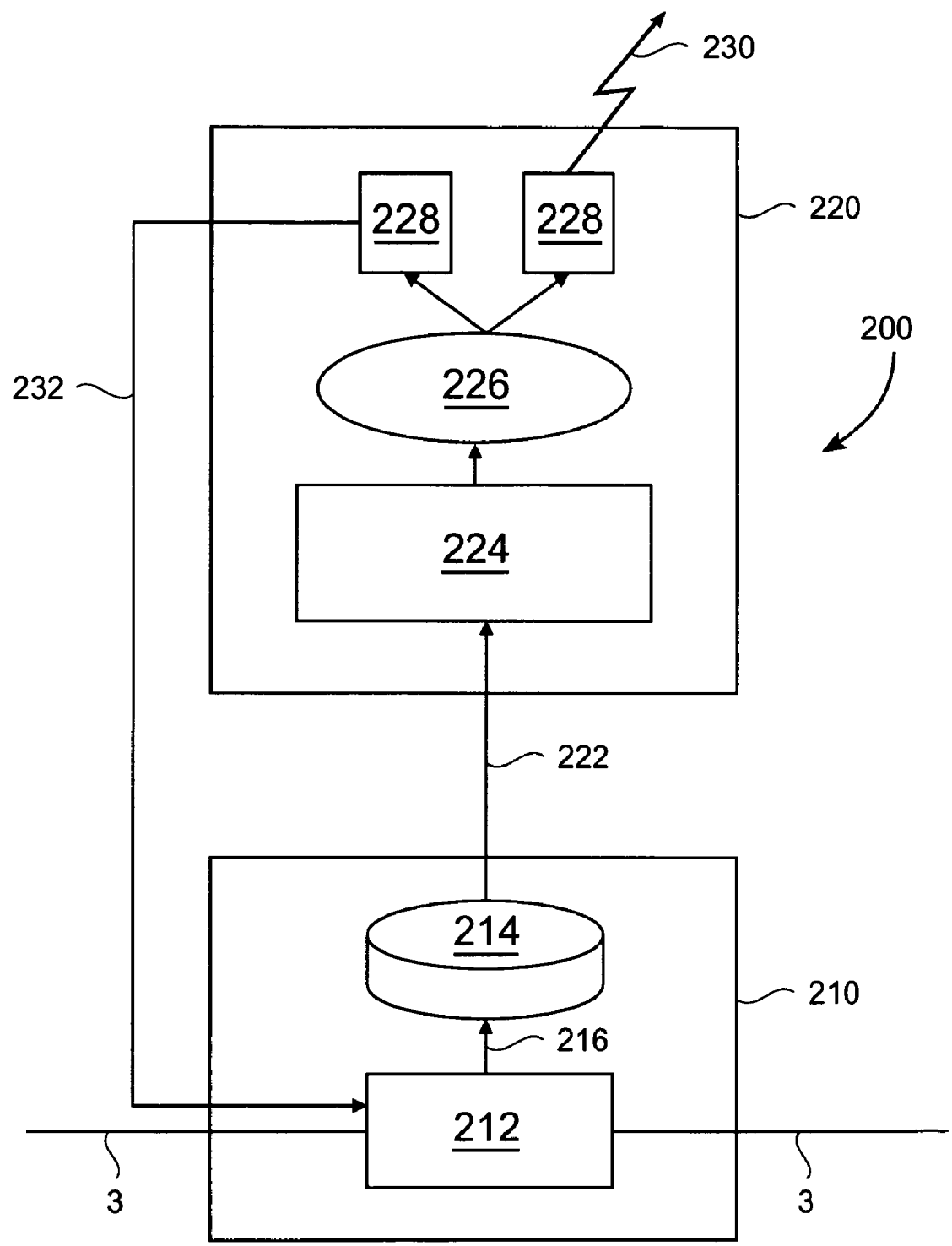
FIG. 6 is a block schematic diagram of a DDoS detection system in accordance with the first main aspect of the invention.

As illustrated in FIG. 6, the detection system 200 comprises a packet sampler 210 for capturing data and an analyzer 220 for analysing data captured by the sampler 210. The sampler 210 includes a network processor 212. It is the network processor 212 which is located in the Internet 14 so as to be able to sample packets from a network stream on a link 3 between two networks (ASes or the like). The network processor 212 is located between respective exterior gateway routers (EGRs) of the two ASes such that it receives all packets transmitted through the Internet 14 at its point of connection thereto. The network processor 212 is arranged to read at least some of said packets in order to derive data pertaining to at least the source IP addresses of said packets and the time of reception of said packets. This data might include source and destination ports, protocol types and packet sizes. Preferably, the network processor 212 is capable of operating at Internet backbone line rates and is arranged to read all such packets to obtain the source related IP address data and reception times.

The sampler 210 includes a data storage facility 214 such as a database for storing accumulated source related IP address data and packet reception times. The data storage facility 214 is connected by a dedicated link 216 to the network processor 212 but in some embodiments the data storage facility 214 may be co-located with the network processor 212 or may be located remotely therefrom and connected thereto via an Internet connection.

The analyzer 220 may comprise a Linux PC, for example, which communicates with the storage facility 214 of the sampler 210 through a Distributed Processing Environment (DPE) such as a Common Object Request Broker Architecture (CORBA) enabled interface 222 to retrieve accumulated data. It will be appreciated, however, that the analyzer 220 could comprise any suitable computing device and need not be a Linux operating device. CORBA is a vendor-independent architecture and infrastructure standard that computer applications can use to work together over networks. The analyzer 220 has a processing unit 224 which executes an analyzer program comprising program code suitable for analysing data retrieved from the storage facility 214 in a manner described hereinafter. When a DDoS attack is detected by the processing unit 224, data comprising an event message (DDoS attack data) is forwarded to an event distributor 226 which in turn publishes the event to event handlers 228. At least one of the event handlers 228 has an interface 230 with other co-operating detection systems 200 at other locations in the Internet 14 so that such systems 200 can make use of the event data in their respective processing units. At least one of the event handlers 228 has an interface 232 for reconfiguring network components with suitable filters to block the DDoS attack packets. The event distributor 226 and event handlers 228 are software based functions. The at least one event handler 228 for reconfiguring network components (devices) may do so through an appropriate management interface supported by such device. This interface could be any suitable management interface such as a Simple Network Management Protocol (SMNP) enabled interface or a Cisco IOS enabled interface, for example.

In contrast with existing methods employed by Intrusion Detection Systems such as Internet Firewalls that rely on identifying anomalies in network traffic based on parameters that vary rapidly with time (in the order of minutes) to detect DDoS attacks, the method in accordance with the first main aspect of the invention looks not to computer behaviour but to human behaviour as a means of obtaining suitable parameters that are invariant of changes in applied Internet technology and are of a general nature that allows the detection of DDoS attacks with a high degree of probability. One known Internet invariant based on human behaviour is diurnal behaviour, i.e. that the traffic patterns in the global Internet 'follow the sun' such that, in any particular geography (region of the world), one can expect greater volumes of traffic to be generated in that geography at say 3 pm in the afternoon than say at 3 am in the early morning. For historic reasons, parts of the IANA IPv4 domain naming space have been reserved for uses in certain geographies. For example, all IP address having the octet "193" as the first octet in their IP addresses are located in Europe whereas octet "199" is found in the IP addresses of USA located devices and "61" for devices located in Asia. A significant fraction of IP addresses identify through simple inspection the geographic location of the emitting host.

The method of the invention makes use of this global characteristic of IP addressing. It comprises the step of observing a packet stream at a point between edge routers of two major networks such as ASes in the Internet 14 to compile a profile over a first defined (predetermined) time period of the respective volumes of packets having IP source addresses that indicate their respective global geographical locations. The first defined time period is preferably 24 hours since this represents a complete cycle of the observed human interaction with the Internet 14. For this purpose, the network processor 212 is arranged to read a proportion of the packets in the observed network packet stream on the link 3 between two ASes and to accumulate in the storage facility 214 data pertaining to the source IP addresses of the read packets and their time of reception (interception). This accumulated data is held in the storage facility 214 until it is retrieved by the analyzer computer 220. In a preferred embodiment, all of the packets on the observed network packet stream are read by the network processor 212.

In order to improve the efficiency of the network processor 212 capturing data pertaining to the source IP addresses of the read packets and their time of reception, the precise time of reception is not recorded. Instead, the network processor 212 is arranged to gather data in a series of time intervals throughout the duration of the first defined time period. This data will therefore comprise the data pertaining to the source IP addresses of the read packets and the time interval associated with the reading of said packets. The time intervals may as a whole comprise the totality of said defined time period or may as a whole comprise only a portion of said defined period. In other words, the first defined time period may be divided into a plurality of equal length, contiguous data capturing time intervals of say 1 minute making a total of 1440 data capturing time intervals for a defined time period of 24 hours, or data capturing may be performed in every nth time interval of the intervals comprising the defined time period, where n is an integer greater than 1. The network processor 212 also captures data pertaining to the source IP addresses of read packets and the time interval when read during next and subsequent defined time periods. The next and subsequent defined time periods are of equal durations to the first defined time period, preferably 24 hours, and are preferably arranged to have an identical pattern of data capturing intervals.

The first defined time period is considered as a learning period during which it is assumed that no DDoS attack involving the observed network link 3 is occurring. The processing unit 224 of the analyzer 220 retrieves data accumulated in the storage facility 214 and processes it to obtain parameters relating to the volumes of packets from the respective geographical locations. These parameters include the variances in the volumes of packets from the respective geographical locations with respect to each other over the intervals of the first defined time period. The parameters allow observations to be made as to the likely changes in the volumes of packets from the other geographies when a change in the volume of packets of a particular geography has been observed for a particular time interval or series of consecutive intervals in a next or subsequent defined time period. From these observations, thresholds are derived upon which future probabilistic decisions can be based as a means of detecting DDoS attacks utilising the observed link 3.

For the next defined time period, the processing unit 224 of the analyzer 220 retrieves accumulated data from the storage facility 214 and analyses said data to correlate, for example, the variances in the volumes of packets from the respective geographical locations with respect to each other over the intervals of said defined time period. For a given time interval or a series of consecutive time intervals of said next defined time period, a change in the volume of packets having IP source addresses indicating a particular geography is compared to one or more thresholds derived from the parameters relating to the volumes of traffic observed during the training period for a corresponding time interval or series of time intervals. For example, given that the volume of packets having an IP source address indicating Asia has increased by say 10% between a time period n−1 and a time period n, it might be expected that the volume of packets having a source IP address indicating Europe will increase by 3 to 5% for that same time period but that the increase in the volume of packets having a source IP address indicating the USA might increase by a much smaller amount of say 1%. A DDoS attack, however, will distort the volumes of packets apparently emanating from specified geographical regions as indicated through their IP source addresses. Therefore, if the change in the volume of packets is greater than the threshold then the processing unit 224 determines that a DDoS attack may be occurring and is transmitting packets on the observed link 3. Each threshold may comprise a ratio of the volume of packets for the particular geography compared with the volume of another geography for the given time interval or series of time intervals. Alternatively, the or each threshold may comprise a ratio of the variance in the volume of packets from a particular geography from one interval or series of intervals to the next compared with a similar measure for traffic from another geography. Where the traffic volumes of three geographies are being measured, this yields two thresholds for the comparison step, either or both of which may be used.

This process will be repeated for each subsequent defined time period. The ratios established during the training period will be maintained and may be updated by the ratios obtained during the next defined time period. Updating the ratios and thus the thresholds derived therefrom may comprise determining an aggregate value for corresponding ratios for respective time intervals. The ratios and thresholds derived therefrom may be stored in a look-up table of the processing unit whose entries are arranged in association with the sequence of the time intervals. Whilst in the preferred embodiment, the defined time periods are set at 24 hours, it will be understood that said defined time period duration may comprise other durations such as a week, a calendar month or even a year.

The DDoS attack detection method in accordance with the invention uses a combination of the expected ratios of volumes of packets having IP source addresses indicating respective global geographical locations with the expected incremental changes in those ratios over a defined time period of 24 hours at a point between two major networks in the Internet 14. Whilst only a quarter of assigned IP (source) addresses provide an indication of geographical location, this is a sufficiently high enough proportion to enable useful observations to be made. In view of this, it is difficult for a DDoS attacker to easily disguise an attack as the distribution of attacking source IP addresses, whether spoofed or not, is unlikely to correspond closely with the patterns observed on the monitored network level link 3. If, for example, the attacker randomly assigned spoofed source addresses to compromised agent devices 44 from the entire available IP address range, then all packet volumes from all geographies would increase equally at generally the same time which would be unusual given the diurnal behaviour of Internet users. Even if the attacker attempted to vary the numbers of agent devices 44 with spoofed addresses operating with time of day to mimic Internet user diurnal behaviour, the attacker could not know the precise ratios observed on the network link 3 and so the attempt at mimicking would not disguise the attack.

When it is determined that a DDoS attack utilising the observed link 3 is occurring, the processing unit 224 issues a data message comprising an event to the event distributor 226 which in turn publishes the event to a plurality of event handlers 228. In addition to the alert that a DDoS attack may be occurring, the event message may include information relating to the location in the network of the suspected DDoS attack, the probability of this being an attack and the algorithm used to calculate said probability. At least one of the event handlers 228 has an interface 230 with other co-operating detection systems alerting them to the detection of the DDoS attack. Similarly, the event handler 228 can receive event messages on this interface from the co-operating detection systems. In this way, the co-operating detection systems can share intelligence on the occurrence of DDoS attacks at different points in the Internet 14. The interface 230 may comprise a CORBA compatible interface. The interface 230 may also comprise an Internet connection.

The processing unit 224 of the analyzer 220 may be arranged to take account of intelligence on the occurrence of DDoS attacks from other co-operating detection systems to modify decisions based on threshold comparisons such that the decision of whether a DDoS attack is occurring is not based solely on a comparison of a traffic volume change parameter with one or more thresholds but includes a probability function derived from a priori knowledge. For example, if the event handler 228 receives an event message indicating that a DDoS attack has been detected in a nearby network, the probability function applied to the comparison of the network volume change parameter to one or more thresholds is more weighted to yield an affirmative result than where no such event message is received. The probability function may not only take account of the number of event messages received and the closeness of the networks identified in the event messages but also the time elapsed since such event messages were received. The probability function may be derived from an application of Bayes Theorem. The comparison step performed by the processing unit 224 may comprise the application of more than one algorithm to a traffic volume change parameter in order to make a determination as to the presence of a DDoS attack. The algorithms may comprise a number of different thresholds as described in the foregoing applied in parallel to the traffic volume change parameter, application of a probability function to a traffic volume change parameter and/or application of a threshold modified by a probability function. The outcomes of the parallel application of the algorithms to the traffic volume change parameter are combined to form a decision on the detection of a DDoS attack.

The processing unit 224 may be arranged to alter the sampling rate of the network processor 212 in response to the proliferation of DDoS attacks being detected by the detection system 200 and co-operating systems whereby the sampling rate is increased as the number of detected attacks increase and vice-versa. It will be observed, however, that communication from the network processor 212 to the processing unit 224 is asynchronous, the flow of communications being in favour of the processing unit 224.

At least one of the event handlers 228 has an interface 232 for relaying reconfiguration messages to other network components to employ filters to block DDoS packets. In the embodiment of the detection system depicted in FIG. 6, it is shown that the interface 232 is linked to the network processor 212 which can comprise one of the network components reconfigured by the event handler 228 for filtering out DDoS attack packets. This enables the event handler 228 to update filtering rules applied by the network processor 212 to received packets.

The detection system 200 may be located at any convenient point in the Internet 14 for sampling a packet stream or streams between two major networks such as ASeS. Installing co-operating detections systems 200 in accordance with the invention at multiple locations within the Internet 14 enables the co-ordinated detection of DDoS attacks. The number of detection systems 200 that need be applied to the Internet 14 need not be as high as it might initially seem. At present, the global Internet comprises approximately 10,000 ASes. As the number of connections an AS has with other ASes follows an inverse power law, it is possible to get good coverage of the Internet 14 by monitoring the connections of a small number of highly connected ASes using detection devices 200 in accordance with the present invention.

Having determined that an attack is occurring, the detection system 200 may initiate blocking of all packets destined for the target device 50. Although this only stops packets destined to the target device 50 crossing the link 3 including both legitimate and attack packets, it makes a contribution to the blocking efforts implemented by the target device 50 itself whilst not interfering with legitimate (or attack packets) travelling on other paths. However, where a number of co-operating detection systems in accordance with the invention implement packet blocking to the target device 50, this can be sufficient to prevent other attack packets that reach the target device 50 from saturating its Internet connection 5 or overwhelming its processing capacity. Consequently, the co-operating detection systems 200 in accordance with the invention act as a distributed packet filtering system to mitigate the effects of an attack on the target device 50. The detection system 200 may implement packet filtering to block packets whose source IP address is rarely seen on the link 3 as a more intelligent response to detection of a DDoS attack, using previously obtained source IP address metrics stored in the storage facility 214 or a memory of the processing unit 224.

The detection system 200 in accordance with the invention could be implemented by ISPs as a revenue generating service to clients. The service would comprise monitoring traffic to the clients' websites and assisting the client in blocking attack traffic based on any known filtering method or a method in accordance with the second main aspect of the invention.

The method in accordance with the second main aspect of the invention recognises that the Internet connected entity with most interest in blocking DDoS attacks is a target device, system or network itself followed by the ISP with which it has a remunerative relationship. Other Internet entities have little incentive to assist a target entity in blocking DDoS attacks unless there is a benefit to be gained for doing so. The method in accordance with the second main aspect of the invention not only provides a more intelligent method for DDoS targets 50 to defend against a DDoS attack but is designed to provide advantages to sending hosts 10 and intermediate nodes to also implement the method.

Figure 7:
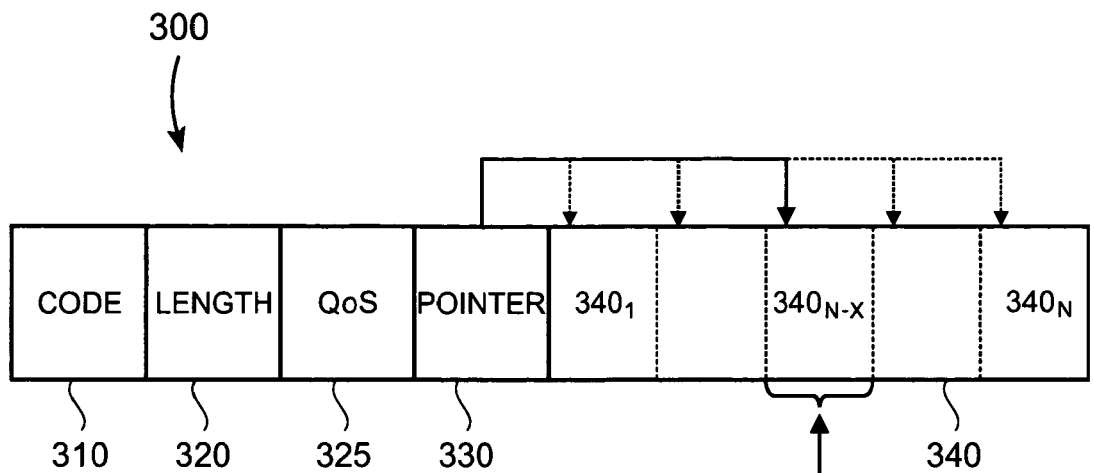
FIG. 7 is a schematic representation of a first additional header portion for a packet for implementing a method in accordance with a second main aspect of the invention.
Figure 8:
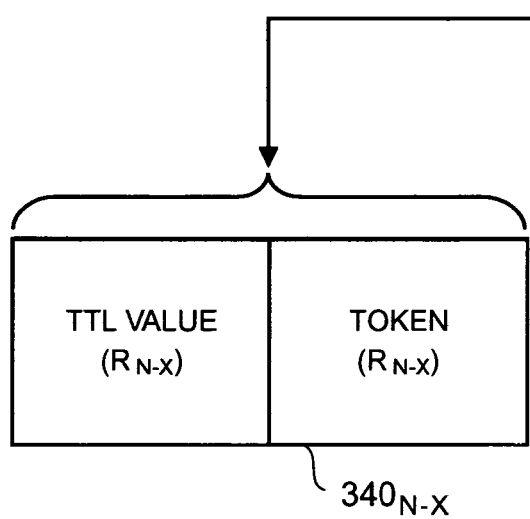
FIG. 8 shows the data elements comprising one data field of a data space of the header portion of FIG. 7.
Figure 9A:
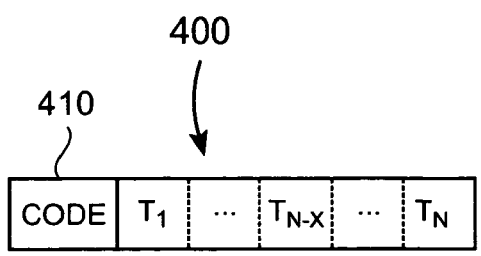
FIG. 9a is a schematic representation of a second additional header portion for a packet for implementing the method in accordance with the second main aspect of the invention.
Figure 9B:
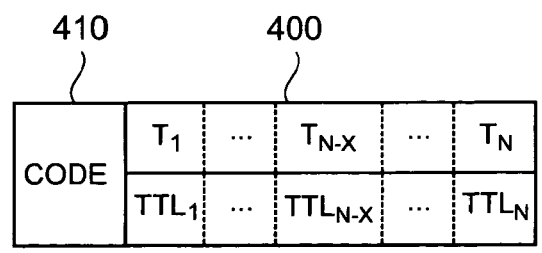
FIG. 9b shows an alternative second additional header portion for implementing the method in accordance with the second main aspect of the invention.

The method in accordance with the second main aspect of the invention will be described with reference to FIGS. 7 to 9 in particular and FIGS. 1 to 6 in general. When a sending host 10 wishes to initiate a data transfer association e.g. connection 1-5 for the transmission of packets to a receiving end host 12 at more than a basic or unauthenticated level of service (service quality, QoS), it employs a packet, referred to as "packet A" herein for ease of description, with an additional header portion 300 (FIG. 7) provided for collecting credentials from routers 18, 24, 30, 20 encountered by packet A on the connection 1-5. The header portion 300 as illustrated in FIG. 7 comprises a code field 310 which can be set to indicate to routers processing packet A that the header portion 300 is to be provided with data (credentials) by that router. The header portion 300 may optionally include a length field 320 indicating the actual and/or total permissible length in octets (bytes) of the header portion 300. Included in the header portion 300 is a pointer field 330 that points to a next unfilled data field $340_{N\text{-}X}$ of a data portion 340. The pointer field 330 points to the octet which begins the next data field $340_{N\text{-}X}$ into which the next router inserts its credentials. Besides this field-wise operation, arithmetic coding of the information is also possible, which would not require a "next"-pointer.

At each router encountered by packet A, the router inserts into the next free data field $340_{N\text{-}X}$ (figure) indicated by the pointer field 330 a value, hereinafter referred to as a "token", that the router must see in subsequent packets following the same path (connection 1-5) to enable it to grant such packets a higher level of service. At the receiving host 12, the data fields $340_{1\ to\ N}$ of the header portion 300 thereby comprise a string of N tokens inserted sequentially by routers 1 to N encountered by packet A on the connection 1-5. Gathering the token data from the routers may be implemented through a modified IPv4 or IPv6 "Record Route" option. The Record Route option in an IP network gathers the IP addresses of the routers in the path through use of a pointer field and data space (data fields).

In addition to a token, each router may optionally insert into the next free data field $340_{N\text{-}X}$ its IP address as a means of cross-referencing said token to enable a determination to be made at that router for subsequent packets following the same path that the token is indeed the token inserted by that router rather than a token inserted by another router which happens to have the same value. This value is, in fact, not necessary because it would be indexed by the TTL (or IPv6 Hop Count) field elsewhere in the packet header, which makes the header portion 300 more compact and also speeds up processing, as the field can directly be accessed with index operations instead of having to search through the list of inserted tokens. This would also obviate the need for the 330 field. However, in a preferred embodiment the router inserts a second non-address related value into the data field $340_{N\text{-}X}$ as a form of cross-referencing, where said second value pertains to the position of the router in the sequence of routers encountered by the packet on the connection 1-5. The second value may comprise a TTL (Time to Live or distance in the path) value, since this field in an IPv4 header is decremented by each router in turn and thus pertains to the position of the router with respect to the receiving host 12. Therefore, where subsequent packets follow the same path over the Internet 14, the TTL value seen at each router will be the same for each such packet at that router and thus the inserted tokens can be assumed to correspond to the routers that inserted them. However, where such a packet follows a different path, then the correspondence between the TTL value and the routers of the connection 1-5 is lost as is the correspondence between the routers and the inserted tokens.

The receiving host 12 on receiving packet A or a predetermined number of such packets returns a message to the sending host 10 identifying to it the string of tokens that is to be inserted into subsequent packets addressed to the receiving host 12 as a means of enabling the routers in the connection 1-5 to grant subsequent packets following the same path a higher level of service. The message may comprise the string of tokens in the sequential order received at the receiving host 10 and is inserted by the sending host 10 into a second additional header portion 400 (FIG. 9a) of each subsequent packet. Alternatively, the message may comprise an array (FIG. 9b) of the tokens indexed by their TTL values which is inserted by the sending host 10 into the second additional header portion 400 of each of the subsequent packets. The second additional header portion 400 may include a code field 410 which when set indicates to routers encountered by a subsequent packet that the packet is to be processed for a higher level of service on verification of the next token in the token data set. A receiving host 12 unwilling to grant the sender 10 elevated priority may not return any information or false information, which both will result in lower quality processing.

The token data collection packet (referred to as "packet A" herein) should be in a form that prevents the sending host 10 from accidentally learning some or all the token data collected by said packet without completing the feedback cycle through the receiving host 12. For example, the token data may be returned prematurely to the sending host 10 in the event that the token data collection packet causes an error message to be emitted at an intermediate router in the connection 1-5. In the Internet, the Internet Control Message Protocol (ICMP) causes an error message to be sent to the sending host 10 that contains much of the original message. Receiving such an error message that contains most or all of the token data may enable a bad-intentioned sending host to determine the token data needed to obtain elevated QoS, which would defeat the purpose of the invention.

The above problem can be addressed by imposing certain restrictions on the token data collection packet. For example, the collection packet's initial TTL/hop count could be made to be very high, say 255 which is the maximum value for this field, to avoid ICMP "TTL/hop count exceeded" packets being generated at intermediate routers. Or, its message size could be made to be below the minimum link Maximum Transmit Unit (MTU) size to avoid ICMP "Fragmentation needed" packets being issued. An alternative would be to collect token data at the end of the collection packet such that such data would be excised when the main part of the original packet is echoed back to the sender as part of an ICMP packet. A further alternative would be to make the collection packet an ICMP packet itself thereby preventing it triggering an error reply packet.

On receiving subsequent packets following the same path, each router in the connection 1-5 identifies the presence of the token data in the second additional header 400 and performs a verification test on the token indexed by its TTL value. If the verification is true then the packet is given a higher level of service. The level of service may be one of two levels, either basic or elevated. Where the verification step is false, the packet is afforded only the basic level of service despite any elevated quality level indicator contained in the packet's header. Furthermore, the fact that the router detected a false claim in the headers may be noted for downstream routers.

Where the connection 1-5 is congested as may occur during a DDoS attack, packets indicating a basic level of service and those failing the verification test are not transmitted or only transmitted once packets having an elevated service level are transmitted over the path.

Rather than the two levels of service as already described, packets may be transmitted over a path in accordance with a plurality of ascending quality levels above the basic level. For subsequent packets following the same path between the sending host 10 and the receiving host 12, an indicator of the required quality of service level for such packets is included in the message from the receiving host 12 conveying the token data set. The quality of service indicator value received in said message at the sending host 10 is inserted by the sending host 10 into a QoS field of each subsequent packet. Consequently, each router in the connection 1-5 on verifying the token indicated by its TTL value is true affords that packet the level of service indicated by its QoS value. Where the verification test results in a false match then the QoS value of that packet is decremented to a lower or even the basic level. This is applicable even where there are only two levels.

For subsequent packets following the same connection 1-5, the string of tokens or the array of tokens indexed by the TTL values will always map to the routers that provided said tokens to the receiving host 12, whereas packets from other sending hosts or packets from the same sending host 10 but following other paths through some of said routers will not hold the correspondence over the whole path. Consequently, at each router, the verification test on a token may simply comprise a determination of whether the token at the relevant position in the string or array has the same value as a secret value stored by that router. This is a computationally simple form of the verification test. Where the token is chosen from say a space of v values and a router (node) is enabled node number k in the connection 1-5, i.e. there are k−1 enabled nodes before it, the probability that a source (e.g. agent device 44) will be able to falsely claim a higher level of service at that node is determined by the value of the function: probability=$v^k$. For example, where the number of routers equals 6 and the token comprises a single bit value, i.e. "1" or "0", the source will only be able to falsely get elevated service for 1 in every 64 packets. A typical path today traverses some 20 routers. If each of these has this system enabled, the probability of falsely getting elevated service is 1 in every $2^{20}$=1 in 1048576, rendering the attack ineffective. The storage required would be only 20 bits or 2.5 bytes (not counting the fixed header size that may include pointers and such).

Where the verification test comprises simply comparing the value of a token with a secret value stored by a router, this has the disadvantage that the secret values stored by routers can readily be learned or easily guessed through trial and error by agent devices 44. Therefore, in a preferred embodiment, the verification test comprises a computation performed on the token associated with a packet in conjunction with one or both of its sources IP address and its destination IP address. In this implementation of the verification test, it is still only necessary to store a single global secret value at each router. The outcome of the computation should not be easily guessable therefore a cryptographic function is preferred although this need not be computationally heavy. Suitable functions for performing the computation on the token and IP addresses include the following:

Token value=H(source address, destination address, secret value)

where H( ) is a hash function; and token value=E_{secret value}*(source address, destination address)

where E_{key}( ) is an encryption function.

As an alternative to inserting the token data set (the string data or the array data) provided by the receiving host 12 into the second additional header portion 400 of each subsequent packet, the sending host 10 may insert this data into the first additional header portion 300 instead thereby negating the need to include a second additional header portion 400. The token data set is inserted by the sending host 10 into the corresponding data fields $340_{1\ to\ N}$ of the first additional header portion 300 and also sets the code field 310 to a value that indicates to routers that they are not to write data to the data portion 340 of the header portion 300 but are to read the data in that field for performing the verification test on the token contained therein. The pointer field 330 may also be disabled by the new code field value. The first additional header portion 300 may also include a QoS field 325 (FIG. 7) into which the sending host 10 can insert the QoS indicator value received from the receiving host 12.

Under conditions of congestion on the path 1-5 caused by heavy traffic and/or a DDoS attack, packets from sending hosts 10 that have been granted a higher level of service by the receiving host 12 will be treated more favourably than packets from other sending hosts, whether legitimate or attack sources. The packets from these sources will be defaulted to a basic level of service and, even where an attacking source attempts to falsely claim a higher level of service, its packets will in the main fail the verification test implemented by the routers and so also be treated less favourably. Thus the method of the invention offers a distributed means to mitigating the effects of a DDoS attack on a target 50 since the decisions to implement a basic level of service for attack packets or to downgrade the level of service being falsely claimed for said packets are made at many nodes in the Internet 14 and at locations away from the target 50 and closer to the attack sources. The further away from a target 50 the attack is stopped or slowed down, the less the impact on other links and nodes closer to the target 50.

The method according to the second main aspect of the invention is implemented at each of the connection nodes including the sending host 10, the receiving host 12 and any intermediate nodes (routers) in the path 1-5 through ISPs 16, 22 and NSPs 24, 30 as software executed by the packet processing units of said nodes. As such, the software for implementing the method is fully backward-compatible with the existing Internet software and infrastructure. However, the packets of those sending hosts not implementing the method have their level of service downgraded or even reduced to the basic level by the routers in the path 1-5 and so are severely impacted under heavy traffic and/or DDoS attacks. It is therefore in the interests of those sending hosts and also the intermediate nodes, especially ISPs, to implement the method in order not to be disadvantaged. The method in accordance with the second main aspect of the invention therefore creates an incentive for sending hosts and intermediary nodes to update their software to include software for implementing the foregoing method in order to avoid becoming a lower class of node from a QoS perspective.

It is rare for the DDoS load on a target 50 to be a problem for its ISP 22 in terms of additional loading. ISPs typically have a diverse set of input routes. By deploying the method in accordance with the second main aspect of the invention in at least routers of the target's ISP 22 provides for a noticeable reduction of the packet flood effect of a DDoS attack, without taxing the ISP 22 or its other clients (potential future targets for a DDoS attack). As already stated, the further away from a target 50 that a DDoS attack is blocked or slowed, the less impact it has on the target 50 and other system links and nodes. Consequently, the method is geared to supporting receiving hosts 12 by distributing the defence of a DDoS attack away from the target 50.

A disadvantage of the method is the increase in packet size for implementing the method, but this can be addressed by utilising the method in accordance with this aspect of the invention when a DDoS attack is detected by the method in accordance with the first main aspect of the invention. The event handlers 228 of the detection systems 200 are arranged to reconfigure network nodes including the target 50 to implement the method in accordance with the second main aspect of the invention when a DDoS is detected by any one of the co-operating detection systems 200.

Figure 10:
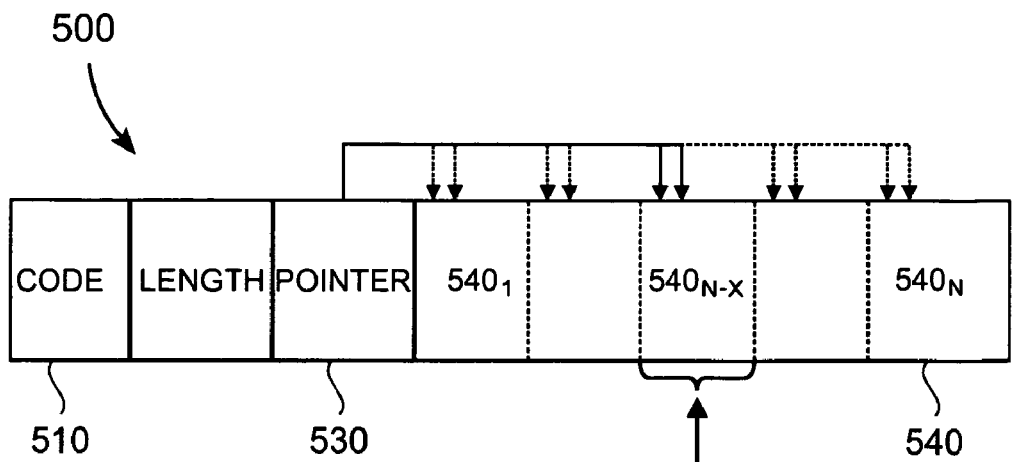
FIG. 10 is a schematic representation of a first additional header portion for a packet for implementing a modified method in accordance with the second main aspect of the invention.
Figure 11:
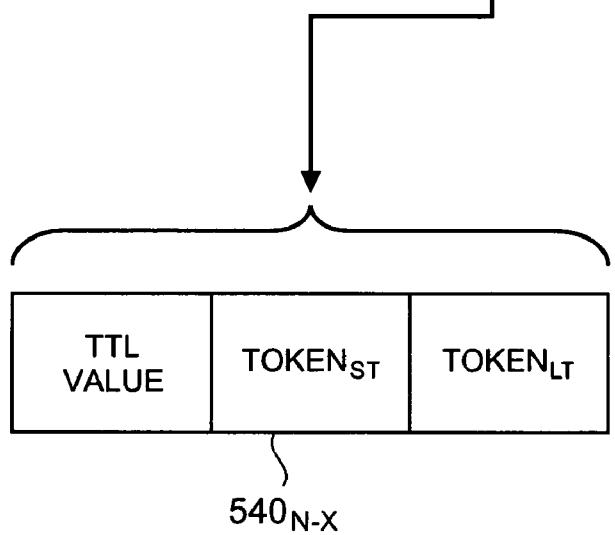
FIG. 11 shows the data elements comprising one data field of a data space of the header portion of FIG. 10.
Figure 12:
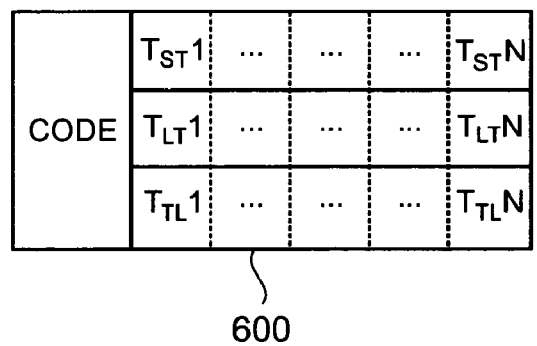
FIG. 12 is a schematic representation of a second additional header portion for a packet for implementing the modified method in accordance with the second main aspect of the invention.

The method in accordance with the second main aspect of the invention may be modified to increase its applicability and to allow for a degree of discrimination to be employed between packets from sending hosts 10 that have recently communicated with the receiving host 12 and those from sending hosts that have not communicated with the receiving host 12 for some period of time. As illustrated by FIGS. 10 to 12, when a sending host 10 wishes to initiate a connection with the receiving host 12, it sends, as before, a packet A to the receiving host 12 to provide credentials from routers that packet A encounters on the connection 5. At each router encountered by packet A, the router inserts into a next free data field $540_{N-X}$ as indicated by a pointer field 530 of an additional header portion 500 a short-term token ($T_{ST}$) value and a long term token ($T_{LT}$) value. The short term token is associated with a first secret value stored by the router that may be changed by the router every few hours and the long term token is associated with a second secret value that may changed after a few days or even longer. The router must see at least one or both of the tokens in subsequent packets in order to enable the router to provide some higher level of service to such packets.

As illustrated in FIG. 12, the token data set received at the receiving host 12 from packet A comprises an array of the short term tokens and the long term tokens indexed by respective TTL values. This data set is transmitted to the sending host 10 which inserts it in a second additional header 600 of each subsequent packet addressed to the receiving host 12. Alternatively, the token data set can be carried in the first additional header portion 500 of each packet with a code field 510 set accordingly.

As before, each router on the path 1-5 accesses the token data set contained in the second additional header portion 600 and runs a verification test on at least one of the short-term token $T_{ST}$ or the long-term token $T_{LT}$. In a preferred arrangement, the router performs a verification test on the short-term token in association with the first secret value and, if that succeeds, affords the packet the level of service indicated by that packet's QoS value. In the event that this first verification test is not true, the router performs a test on the long-term token in association with the second secret value stored in that router and, if this test succeeds, affords the packet a higher level of service than the basic level. In this latter case, the router may be arranged to decrement the level of service indicated by the packet's QoS value as a means of providing more favourable treatment of packets that have been issued by a sending host 10 that last communicated with the receiving host during the period that the short-term token has been current. In the event that both verification tests are not true then the packet receives a decremented level of service or even a basic level of service.

The use of both a short-term token and a long-term token allows routers to discriminate in favour of sending hosts that have recently communicated with the receiving host but still allows sending hosts who have not communicated with the receiving host for some time to claim a service level above that of the basic level. In a further modification of the method, the routers may store a series of past short-term and/or past long-term secret values and allocate a series of token values associated with said past secret values to packet A on initiation of a new connection between a sending host and a receiving host. The receiving host sends the token data set comprising the lists of such tokens issued by each router to the sending host for insertion in subsequent packets as before. Subsequent packets addressed to the receiving host are processed at each router to verify against the current short-term token value to seek a true result. On failure, the verification test is performed for each of any short-term tokens associated with past short-term secret values and then any tokens associated with past long-term secret values to seek a true result. This process continues until a true result is obtained or all tests end in failure. The success of any verification test authenticates the packet for more favourable treatment than packets that fail all the verification tests but the level of service available to an authenticated packet diminishes according to how far down the list of tokens is required to obtain a true result.

In a further modification of the method, each router allocates a set of token values associated with respective secret values which in turn are associated with respective QoS levels to packet A on initiation of a new connection between a sending host and a receiving host. This enables the receiving host to choose the level of service for the subsequent packets from the receiving host. The receiving host therefore sends to the sending host a token data set comprising token values selected from the sets of tokens provided by the routers where said selected token values correspond in each case to the QoS level chosen by the receiving host for that sending host. The QoS level value is also communicated to the sending host as part of the token data set for insertion in subsequent packets addressed to the receiving host.

Where the token is chosen from a value space v and each secret value has a history length h and there are q QoS levels then the probability of a packet allocated by its source with a random value matching a given QoS level is defined by the relationship: probability=$1-(1/v)^{hq}$ if it is compared against all QoS levels. However, if it is compared to only the current QoS level, the relationship is adjusted to: probability=$1-(1/v)^h$. Therefore, for a path having k hops (nodes performing verification tests), the probability of a packet falsely recording true results at all k nodes is given by the relationship: probability=$1-(1-s)^k$, where s=$1-(1/v)^h$.

In yet a further modification of the method, the routers are each arranged not to immediately downgrade a packet on the occurrence at that router of a first verification test false result. The router may include a verification test result counter which is incremented on the occurrence of a false result. When this counter reaches a predetermined threshold, then the step of downgrading packets recording false results will commence. This modification makes the method more robust against one-hop path changes or to a router changing its secret value whilst traffic is flowing.

In another example embodiment, every router might have three possible values v, 0, 1, and 2, to store in its "personal field". Instead of assigning 2 bits to each "personal field", the i-th router will consider the entire "storage field" 330 as a number and then insert its value by adding v*(3^i) to the "storage field". When performing the comparison step, it compares v against INTEGER("storage field"/3^i) MOD 3.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method of detecting a distributed denial of service (DDoS) attack in the Internet, the method comprises the steps of:

using a sampling unit for sampling packets at a point in the Internet during a number of time intervals of a first predetermined time period during which the packets are received to obtain data pertaining to source addresses of packets and the time intervals associated with receipt of the packets; and using an analyzing device for:
analyzing said data to obtain, for each of the time intervals associated with the receipt of the packets, at least one parameter relating to a packet metric for packets received at said point from respective specified geographical regions; and for a particular time interval of a next predetermined time period, comparing a packet metric parameter for packets received in the particular time interval from a specified geographical region with a threshold derived from the at least one packet metric parameter obtained for a corresponding time interval of the first predetermined time period, the result of said comparison being used to determine an existence of a DDoS attack.

2. The method of claim 1, further comprising at least one limitation taken from a group of limitations consisting of:
wherein the packet metric comprises at least one packet metric;
wherein the step of sampling packets at a point in the Internet comprises sampling packets at a boundary between two Internet connected networks;
wherein the two networks each comprise an autonomous system;
wherein the two networks each comprise any of an enterprise network, an Internet Service Provider or a Network Service Provider;
wherein the step of sampling packets is performed at an Internet backbone rate;
wherein all packets received at the point in the Internet are sampled to obtain data pertaining to their source addresses and associated time intervals of said packets;
wherein the step of sampling packets at a point in the Internet comprises sampling packets received during each of the time intervals comprising the first predetermined time period;
wherein the step of sampling packets at a point in the Internet comprises sampling packets received during each nth time interval of the time intervals comprising the first predetermined time period, where n is an integer greater than 1;
wherein the specified geographical regions are determined from the data pertaining to the source addresses of packets received at said point in the Internet where said data comprises part of a 32 bit IP source address for each such packet;
wherein the specified geographical regions are determined from a first octet of the 32 bit numerical source address of each packet received at said point in the Internet;
wherein the first predetermined time period comprises a training period for obtaining for each time interval of said period at least one parameter relating to a packet metric for packets received at said point in the Internet from respective specified geographical regions;
wherein the step of comparing a packet traffic metric parameter for packets received from the specified geographical region in a time interval with a threshold derived from the packet metric parameter obtained for the corresponding time interval of the first predetermined time period is implemented for time intervals of subsequent predetermined time periods;

wherein the duration of the first predetermined time period, the next predetermined time period and/or the subsequent predetermined time periods is one of 24 hours, a week, a calendar month or a year;
wherein the duration of the time intervals of the first predetermined time period, the next predetermined time period and/or the subsequent predetermined time periods comprises a predetermined duration which is a fraction of the first predetermined time period;
wherein the at least one packet metric parameter for packets received at said point in the Internet from respective specified geographical regions for each time interval of the first predetermined time period is updated using the packet metric parameters determined for corresponding time intervals of the next and/or the subsequent predetermined time period;
wherein the threshold derived from the packet metric parameter obtained for a time interval of the first predetermined time period comprises a ratio of the volume of packets for the specified geographical region compared with the volume packets for another geographical region for the same time interval or a ratio of the variance in the volume of packets from the specified geography with the variance in the volume of packets for another geographical region;
wherein the step of comparing a packet metric change parameter for packets received from the specified geographical region in the same time interval with a threshold derived from the at least one packet metric parameter comprises comparing said packet metric parameter with a plurality of thresholds derived the at least one packet metric parameter obtained for the corresponding time interval of the first predetermined time period, the result of said comparisons being combined to determine the existence of a DDoS attack;
wherein the step of comparing a packet metric parameter for packets received from the specified geographical region in a time interval with a threshold derived from the at least one packet metric parameter obtained for the corresponding time interval of the first predetermined time period is modified by a probability function based on data received from at least one other DDoS attack detection system;
wherein a time interval may comprise a series of consecutive time intervals; and
wherein the analyzer initiates at least one router in the Internet in response to a determination by the or a DDoS system of the existence of a DDoS attack.

3. The method of claim 1, further comprising the step of transmitting data from the or a DDoS attack detection system comprising information about a DDoS attack detected by that system to other co-operating DDoS attack detection systems located at other points in the Internet.

4. The method of claim 1, further comprising the step of transmitting data from the or a DDoS attack detection system to other network nodes for reconfiguring said nodes to filter packet traffic in response to a DDoS attack detected at said DDoS attack detection system.

5. The method of claim 1, further comprising the step of altering the sampling rate of packets at said point in the Internet in response to information received at the or a DDoS detection system concerning the level of DDoS attacks detected by that system or co-operating attack detection systems.

6. The method of claim 1, further comprising the step of blocking all packets received at the sampling point having a specified IP destination address upon detection of a DDoS attack targeting that IP destination address.

7. The method of claim 1, further comprising the step of blocking packets received at the sampling point having a source IP address that is unlikely to be encountered at the sampling point upon detection of a DDoS attack based on known source IP address metrics.

8. An article of manufacture comprising a non-transitory computer usable medium having computer readable program code means embodied therein for causing detection of a distributed denial of service (DDoS) attack in the Internet, the computer readable program code means in said article of manufacture comprising computer readable program code means for causing a computer to effect the steps of claim 1.

9. A system for detecting a distributed denial of service (DDoS) attack in the Internet, wherein the system comprises:
 a sampling device for sampling packets at a point in the Internet during a number of time intervals of a first predetermined time period to obtain data pertaining to the source addresses of the packets and their associated time intervals;
 an analyzer device for analysing said data to obtain for each time interval at least one parameter relating to a packet metric for packets received at said point from respective specified geographical regions; and for comparing a packet metric parameter for packets received from a specified geographical region during a time interval of a next predetermined time period with a threshold derived from the at least one packet metric parameter obtained for the corresponding time interval of the first predetermined time period, the result of said comparison being usable to determine the existence of a DDoS attack.

10. The system of claim 9, further comprising at least one limitation taken from a group of limitations consisting of:
 wherein the packet metric used by the analyzer to obtain a packet metric parameter comprises at least one packet metric;
 wherein the sampling device is arranged to sample packets at a point in the Internet comprising a boundary between two Internet connected networks;
 wherein the network sampler comprises a network processor and includes a data storage facility for storing the data pertaining to the source addresses of the sampled packets and their associated time intervals;
 wherein the two networks each comprise an autonomous system;
 wherein the two networks each comprise any of an enterprise network, an Internet Service Provider or a Network Service Provider;
 wherein the packet sampler is arranged to sample packets received at a point in the Internet during each of the time intervals comprising the first predetermined time period;
 wherein the sampling device is arranged to sample packets received at a point in the Internet during each nth time interval of the time intervals comprising the first predetermined time period, where n is an integer greater than 1;
 wherein the analyzer is arranged to determine the specified geographical regions from the data pertaining to the source addresses of packets received at said point in the Internet where said data comprises part of a 32 bit IP source address for each such packet;
 wherein the analyzer device includes an event handler for transmitting data from the or another DDoS detection system comprising information about a DDoS attack detected by that system to other co-operating DDoS attack detection systems located at other points in the Internet;
 wherein the event handler transmits data from the or another DDoS attack detection system to other network nodes for reconfiguring said nodes to filter packet traffic in response to a DDoS attack detected at said detection system;
 wherein a processing unit of the analyzer device is arranged to alter the sampling rate of the packet sampler in response to information received by the event handler from the or another DDoS detection system concerning the level of DDoS attacks detected by that system or co-operating detection systems;
 wherein the network sampler is arranged to block all packets destined for a specified IP destination address in response to information received by the event handler from the or another DDoS detection system concerning a DDoS attack targeting that IP destination address;
 wherein the network sampler is arranged to block packets received at the sampling point having a source IP address rarely encountered at the sampling point in response to information received by the event handler from the or another DDoS detection system concerning detection of a DDoS attack.

11. A computer program product comprising a non-transitory computer usable medium having computer readable program code means embodied therein for causing detection of a distributed denial of service (DDoS) attack in the Internet, the computer readable program code means in said computer program product comprising computer readable program code means for causing a computer to effect the functions of claim 9.

12. An analyzer for detecting a distributed denial of service (DDoS) attack in the Internet, wherein it comprises:
 a processing unit arranged to retrieve data from a data storage facility, said data pertaining to the source address of each of a plurality of sampled packets received at a point in the Internet and a time interval for each packet during which it was sampled, said time intervals comprising a predetermined time period;
 the processing unit being arranged to execute software code comprising an analyzer program to obtain for each time interval at least one parameter relating to a packet metric for packets received at said point from respective specified geographical regions; and for comparing a packet metric parameter for packets received from a specified geographical region during a time interval of a next predetermined time period with a threshold derived from the at least one packet metric parameter obtained for the corresponding time interval of the first predetermined time period, the result of said comparison being used to determine the existence of a DDoS attack.

13. A computer program product comprising a non-transitory computer usable medium having computer readable program code embodied therein for causing functions of an analyzer for detecting a distributed denial of service (DDoS) attack in the Internet, the computer readable program code in said computer program product for causing a computer to effect the functions of claim 12.

14. A method of authenticating a packet at a router in a connection between a sending host and a receiving host, wherein it comprises the steps of:
 using the router for:
 reading a value of a token from a token data set inserted in a header of said packet by the sending host, said token data set being obtained from a number of routers comprising the connection on initiation of the connection;
verifying said read token at the router; and
wherein the result of the verification step is true, providing said packet with an improved quality of service.

15. The method of claim 14, further comprising at least one limitation taken from a group of limitations consisting of:
wherein the step of verifying the read token at the router comprises verifying said read token based on a secret value stored at the router;
wherein the token data set is provided to the sending host by the receiving host after receipt by the receiving host of at least one packet from the sending host for insertion by the sending host in subsequent packets being sent to the receiving host;
wherein the token data set includes the IP addresses of routers comprising the connection between the sending and receiving hosts;
wherein the token data set obtained from the routers comprising the connection between the sending and receiving hosts includes for each router a second, non-address related value, where the second value pertains to the position of the router in the sequence of routers comprising the connection;
wherein the second value comprises one of a Time to Live and a distance in the path value;
wherein the token data set has a code associated therewith that identifies to a router encountering a packet containing the code field that said router is to perform the verification step on a token of the token data set inserted in said packet;
wherein the token data set inserted into packets by the sending host includes a desired QoS level, selected from a plurality of possible QoS levels that the routers in the connection may implement;
wherein the verification step comprises performing a cryptographic computation on the read token;
wherein, where the verification step returns a false result, the router does not provide the packet with an elevated QoS;
wherein, where the verification step returns a false result, the router decreases the QoS level of the packet;
wherein the token data set includes a short-term token and a long-term token for each router of the connection;
wherein the token data set includes a short-term token and a long-term token for each router of the connection, where said short-term and long-term tokens correspond to respective secret values stored by each of said routers;
wherein the verification step comprises firstly verifying a short-term token, and if a true result is achieved, providing the packet with an elevated QoS;
wherein the verification step on the short-term token returns a false result, the verification step is then performed on the long-term token and, if a true result is achieved, the packet is provided with an elevated QoS;
wherein the QoS provided to a packet in response to a true result from the verification step on the long-term token is at a QoS level below that provided to the packet where the verification step on the short-term token returns a true result.

16. A non-transitory computer readable medium containing computer code executable by a processing unit for implementing the method of claim 14.

17. An article of manufacture comprising a non-transitory computer usable medium having computer readable program code means embodied therein for causing authentication of a packet at a router in a connection between a sending host and a receiving host, the computer readable program code means in said article of manufacture comprising computer readable program code means for causing a computer to effect the steps of claim 14.

18. A router for authenticating a packet received at the router in a connection between a sending host and a receiving host, wherein said router comprises:
a processing device arranged to:
read a value of a token from a token data set inserted in a header of said packet by the sending host, said token data set being obtained from the router and a number of other routers comprising the connection on initiation of the connection;
to verify said read token at the router; and
where the result of the verification step is true, to provide said packet with an improved quality of service.

19. The router of claim 18, comprising a memory for storing a secret value for comparing with the read token in order to verify said read token.

20. The router of claim 18, further comprising at least one limitation taken from a group of limitations consisting of:
wherein the processing unit is arranged to recognise a code field associated with the token data set and, on recognising said code field, to perform the verification step on a token of the token data set;
wherein the processing unit is arranged to perform a cryptographic computation on the read token;
wherein the router stores in its memory a first secret value corresponding to a short-term token and a second secret value token corresponding to a long-term token;
wherein the processing unit is arranged to firstly verifying a short-term token against the first secret value, and if a true result is achieved, to provide the packet with an elevated QoS;
wherein, where the processing unit returns a false result from the step of verifying the short-term token against a first secret value, it then performs a verification step on the long-term token against the second secret value and, if a true result is achieved, provides the packet with an elevated QoS.

21. A computer program product comprising a non-transitory computer usable medium having computer readable program code embodied therein for causing functions of a router for authenticating a packet received at the router in a connection between a sending host and a receiving host, the computer readable program code in said computer program product for causing a computer to effect the functions of claim 18.

* * * * *